United States Patent Office 3,666,398
Patented May 30, 1972

3,666,398
METHOD OF DYEING SHAPED ORGANIC MATERIALS FROM LIQUID AMMONIA DYE BATHS
Joseph P. Tratnyek, 476 Concord Road,
Sudbury, Mass. 01776
No Drawing. Continuation-in-part of application Ser. No. 687,439, Dec. 4, 1967. This application Feb. 1, 1971, Ser. No. 111,743
Int. Cl. D06p 1/68, 3/00
U.S. Cl. 8—4                                                    10 Claims

ABSTRACT OF THE DISCLOSURE

A dye system in which materials are bathed in a dyebath formed of a dye dissolved in substantially anhydrous liquid ammonia.

---

This application is a continuation-in-part of copending application Ser. No. 687,439 filed Dec. 4, 1967 now abandoned.

This invention relates to systems of dyeing or coloring materials and more particularly to new methods of dyeing materials such as proteinaceous, cellulosic, and synthetic fibers and sheets.

Dyes are usually applied to fibrous material from aqueous solution, and generally require imbibition periods of many minutes even with heated solutions. Additionally, various dyes capable of dyeing one type of fiber in aqueous solution are ineffective for other types of fiber. A usual classification of dyestuffs is according to their use, and typically will include direct, disperse, naphthol, reactive, and sulfur dyes.

Direct dyes are water-soluble dyes that exhaust onto cellulosic fibers from a salt bath without mordanting. Chemically, nearly all direct dyes are azo products with one or more sulfonic radicals, and most contain a plurality of the azo groups. They are used on cotton, rayon, silk, and wool, but are not considered suitable for dyeing cellulose acetate.

Disperse dyes are colored organic dyes that although relatively insoluble can be dispersed in water in particulate form. These dyes typically are not useful on cotton or viscose rayon, but the particles have an affinity for and thus dye cellulose acetate well.

Naphthol dyes are water-insoluble azo dyes usually formed on or in a fiber by a two-step process in which a diazotized organic amine is combined in aqueous solution with naphthol previously impregnated into the textile material. These are primarily used to dye cotton, rayon, silk, and nylon.

Dyes with chemically reactive groups which can react with a substrate material to bind themselves chemically to the substrate are known as reactive dyes. Usually, special conditions or operations are required to use such dyes.

Sulfur dyes are normally insoluble substances brought into water-soluble form for dyeing by treatment with hot alkali solution containing Na$_2$S. These are generally used for coloring cotton and, to a limited extent, on silk and rayon because the handle of the latter is adversely affected. Because of severe damage from the alkaline sulfur bath, these dyes are not used on wool.

The dyeing systems and the types of fibers for which a dye is particularly useful have heretofore been largely limited to dyeing from aqueous solution. In a few limited instances, dyes have been applied from organic solvents such as alcohols or aromatics and the like.

It is a primary object of the present invention to provide a novel dyebath for dyeing substrate materials. Another object of the present invention is to provide a novel method of dyeing which, on the whole, is substantially faster and therefore more economical than prior art methods, and which surprisingly allows materials to be dyed with dyestuffs hitherto incapable of dyeing such materials.

To effect the foregoing and other objects, the present invention generally contemplates the solvation of dyestuffs in a solvent of substantially anhydrous liquid ammonia, and application of the dye solution to a substrate material.

Other objects of the invention will in part be obvious and will in part appear hereinafter. The invention accordingly comprises the processes involving the several steps and the relation of one or more of such steps with respect to each of the others, and the products possessing the features, properties and relation of elements which are all exemplified in the following detailed disclosure and the scope of the application of which will be indicated in the claims.

In the following detailed description of the present invention, the term "liquid ammonia" refers to ammonia (NH$_3$) in its liquid state, i.e. which boils at about $-33.4°$ C. at atmospheric pressure, and not to a solution of ammonium hydroxide. However, it will be appreciated that water can be mixed with liquid ammonia in surprisingly large amounts without the water becoming frozen. Even when approximately equal quantities of liquid ammonia and water are mixed, there remains an appreciable quantity of the liquid ammonia in the mixture so long as the mixture is maintained at equilibrium conditions below the boiling point of the liquid ammonia.

Generally, a number of dyestuffs, soluble in liquid ammonia, are dissolved in the latter to form dyebaths. The usable dyes include such diverse dyes as direct, disperse, naphthol, reactive, and sulfur types. Vat dyes do not appear to be soluble in liquid ammonia, hence, are considered among the substances not included in the invention. The dyebaths of the present invention are effective for dyeing a wide range of materials to which they are applied, for example, cotton, silk, wool, viscose, rayon, acetate, triacetate, acrylic, modacrylic, nylon, polyester, and other natural and synthetic materials. Certain materials that are not considered dyeable by a particular dye in aqueous or organic solvents, unexpectedly proved to be quite dyeable by that dye in a liquid ammonia solution. For example, direct dyes and reactive dyes, in liquid ammonia, color triacetate deeply. Further, with liquid ammonia dye solutions, dyeing is generally completed in about 20 seconds or less although application of the same dye with conventional techniques employs much longer imbibition times and much higher dyebath temperatures.

The depth of shade achieved in the present invention appears to depend primarily on the concentration of the dyestuff in the liquid ammonia, and not on dwell time of the fibers in the dyebath. Imbibition periods greater than about 20 seconds do not materially improve coloration.

That the dyestuff-liquid ammonia solution is responsible for the unique consequences achieved is quite clear, inasmuch as dyebaths prepared from the same dye dissolved in water, in ammonium hydroxide and also in various organic solvents, failed to provide comparable results.

The following examples, illustrative of the principles of the present invention, are based upon application of a bath of a dyestuff dissolved in liquid ammonia, to a number of different materials as follows: (1) bleached 80 x 80 cotton print cloth; (2) bleached mercerized 80 x 80 cotton print cloth; (3) spun viscose rayon print cloth (high wet modulus); (4) spun triacetate cloth and (5) a multifiber test fabric consisting of cloth bands of the following sequence of fibers identified generically, and in some instances by trade name: dull acetate; acrylic (Acrilan 1656); triacetate (Arnel dull); raw cotton; acrylic (Creslan 61), polyester (Dacron 54); polyester (Dacron 64); nylon (nylon 60); acrylic (Orlon 75); silk; modacrylic (Verel A); viscose; and wool.

Fabrics identified as (1), (3), (4), and (5) were used in Examples 1 to 7 inclusive. In Examples 8 and 10, fabrics (1), (2), (4), and (5) were used; in Example 9 only fabric (1) was employed, and in Examples 11 and 12, fabric (5) was used.

In Examples 1 to 7 inclusive, in order to compare the effect of application of dyes from different solvents, each dye was applied to fabric by three different methods; from a conventional aqueous bath, from an organic solvent bath, and from a liquid ammonia bath. The conventional method of application follows that generally outlined for each dye by the manufacturer of the dyestuff or by the Color Index. For organic solvent application, an available organic solvent was selected in which the dye dissolved most readily. The solvent for the dye in the present invention was anhydrous ammonia liquid. Dye solutions were kept at 1.5% dye in all cases with a total fabric-to-liquor ratio of 20 to 1.

The basic procedure was to submerge all swatches of fabric in the dye solution for the manufacturer's recommended times in the case of normal aqueous dyeing, and for twenty seconds for solvent and for ammonia dyeing. Excess organic solvent or ammonia was allowed to evaporate from the treated fabrics at room temperature (about 20° C.) before drying in an oven at 120-130° C. for about 1 to 2 minutes. The dyed fabrics were then usually rinsed in warm water. All were then washed in hot water containing Alconox detergent (a compounded alkyl aryl sodium sulfonate detergent obtained from Alconox, Inc.). Washing and rinsing the fabrics was continued until excess dye was removed from the fabrics or until rinse water showed little or no coloring. The fabrics were then dried by ironing.

After being ironed dry, each dyed fabric swatch was cut in half. One half was retained as is, while the other half was immersed in trichloroethylene as a dry-cleaning solvent. Each fabric was continually rinsed in fresh trichloroethylene until little or no further color appeared in the solvent. The fabrics were then air dried and ironed.

EXAMPLE I

Dye: Pyrazol Fast Brilliant Blue A (Sandoz, Inc.) (C.I. Direct Blue 67)

The Color Index (C.I. No. 27925) describes this dye as a diazo type used for dyeing cotton, viscose rayon, and unions. It is also used for direct printing on cellulose. Maximum affinity for cellulose is reported at 80° C. by normal dyeing methods.

Normal application.—The dyebath is prepared by dissolving 4.8 gms. of dye in 316 ml. distilled water making a 1.5% solution of dye. The dyebath is brought to about 65° C. and the fabrics are added (15.8 gms. total fabrics). The bath is brought to 80-85° C. and run for 10 minutes. Sodium chloride (1.5 gms.) is added. After 30 minutes, the fabrics are removed, rinsed in warm water, washed in hot water containing Alconox detergent, and ironed dry.

Organic solvent application.—The dye is not soluble in acetone or trichloroethylene. It is soluble in methanol. Prepare dyebath by dissolving 3.8 gms. of dye in 256 ml. methanol.

Saturate the fabrics (12.8 gms. total) in the dyebath for about 20 seconds. Dry the fabrics at 20° C. to remove excess solvent before final drying at 135° C. for about two minutes. Rinse and wash with detergent as before. Iron dry.

Anhydrous ammonia application.—Prepare the dyebath by dissolving 4.2 gms. of dye in 276 ml. anhydrous ammonia.

Saturate the fabrics (13.8 gms. total) in the dyebath for 20 seconds. Allow excess ammonia to evaporate at 20° C. Finish drying at 135° C. for about 2 minutes. Rinse and wash and iron dry as above.

Results.—By the conventional aqueous techniques, raw cotton, bleached cotton, viscose rayon, high wet modulus rayon, and silk were dyed. Nylon and wool were highly colored but the shade was different from the dyestuff on the other dyed fibers. Triacetate was uncolored.

Application of dyestuff from organic solvent produced only light coloration or staining. Cottons, nylon, and rayons showed the most coloration.

Application of dyestuff from anhydrous ammonia produced intense coloration of dull acetate, triacetate, viscose, and silk. Cottons were dyed in a lighter shade. The dyeing of cottons and rayons with this technique did not produce as deep a coloration as that obtained in conventional dyeing. However, triacetate which was uncolored by the conventional technique can be highly colored using the anhydrous ammonia dyebath.

The effect of dry cleaning samples prepared by all methods was negligible.

EXAMPLE II

Dye: Polyester Blue GLF (Eastman Chemical Products, Inc. (C.I. Disperse Blue 27)

This dye is described in the Color Index as an anthraquinone type used for polyester, acetate, triacetate, and nylon fibers. Silk and wool are reported to be dyed by it; cotton and viscose slightly stained. The dye is reported soluble in acetone, benzene, carbon tetrachloride, and ethanol. This dye is the fastest to light, washing, and dry cleaning of the Eastman line of blues.

Normal application.—Best colors are obtained with use of "carriers." Triacetin was selected as the carrier and the procedure follows that recommended in the Celanese Technical Bulletin TD-15B—Dyeing, Printing, Finishing, and Heat Treatment of Fabrics and Blends of Arnel Triacetate.

The dyebath is prepared with 4.1 gms. of dye and 0.4 gms. triacetin in 268 ml. of distilled water (1.5% solution of dye). The fabrics (13.4 gms. total) are entered into the dyebath at 45-50° C. The bath is brought to 96-100° C. over a period of ½ hour and then the bath is held at that temperature for one hour. The fabric is then rinsed in warm water, washed in hot water containing Alconox detergent, and finally ironed dry.

Organic solvent applications.—This dye appeared only very slightly soluble in acetone, almost insoluble in methanol, but slightly in dioxane. The dyebath consisted of 3.8 gms. of dye in 248 ml. of dioxane. Not all dye dissolved.

The fabrics (12.4 gms. total) were saturated in the dyebath for one minute. The excess dioxane was drained from fabric and the fabric air dried at 20° C. Final drying was at 135-140° C. for several minutes. The fabrics were then rinsed, washed, and ironed dry as previously stated.

Anhydrous ammonia application.—Prepare the dyebath with 4.3 gms. of dyestuff in 252 ml. of anhydrous ammonia. Dye did not appear completely soluble in the ammonia. The fabrics (14.1 gms. total) were saturated in the dyebath for 20 seconds and then drained and air dried at 20° C. to remove excess ammonia. Final drying was at 135-140° C. for several minutes. Finally, the fabrics were rinsed, washed, and ironed dry as before.

EXAMPLE III

Dye: Polyester Blue GR (Eastman Chemical Products, Inc.) (C.I. Disperse Blue 62)

This dye is described in the Color Index as an anthraquinone type used for polyester, acetate, triacetate, and nylon fibers. It was developed for use where minimium staining of protein and celulose fibers is necessary.

Normal application.—Same application is used as for the dye of Example II.

The dyebath is prepared with 4.2 gms of dye and 0.4 gms triacetin in 278 ml. of distilled water (1.5% solution of dye).

The fabrics (13.9 gms. total) are entered into the dyebath at 45–50° C. The bath is brought to 96–100° C. over a period of ½ hour and then the bath is held at that temperature for one hour. The fabric is then rinsed in warm water, washed in hot water containing Alconox detergent, and finally ironed dry.

Organic solvent application.—This dye appeared to be fairly soluble in acetone and dioxane, less soluble in methanol.

The dyebath consisted of 3.9 gms. of dye in 258 ml. of dioxane.

The fabrics (12.9 gms. total) were saturated in the dyebath for one minute. The excess dioxane was drained from the fabric and the fabric air dried at 20° C. Finally drying was at 135–140° C. for several minutes. The fabrics were then rinsed, washed, and ironed dry as previously stated.

Anhydrous ammonia application.—Prepare the dyebath with 4.0 gms. of dyestuff in 262 ml. of anhydrous ammonia. Dyestuff was not completely soluble. The fabrics (13.1 gms. total) were saturated in the dyebath for 20 seconds and then drained and air dried at 20° C. to remove excess ammonia. Final drying was at 135–140° C. for several minutes. Finally, the fabrics were rinsed, washed, and ironed dry as before.

EXAMPLE IV

Dye: Amacel Heliotrope R. (American Aniline Products, Inc.) (C.I. Disperse Violet 1)

This dye is described in the Color Index (C.I. No. 61100) as an anthraquinone type dye. It is recommended by the manufacturer for use on acetate and may be used on nylon. Silk and wool are heavily stained; cotton and viscous slightly stained. On acetate this dye is reported to build up and level with rapid absorption.

Normal application.—This disperse dye is recommended for use without a carrier. The dyebath is prepared with 4.0 gms. of dye in 270 ml. of distilled water.

The fabrics (13.3 gms. total) are entered into the dyebath at 50° C. and the temperature is raised to 82–88° C. over a ½ hour period. Dyeing is continued for one hour. The fabrics are then removed, rinsed in warm water containing Alconox detergent, and finally ironed dry.

Organic solvent application.—Prepare dyebath with 3.8 gms. of dye in 248 ml. of dioxane. Some insoluble residue from dye remains.

Saturate the fabrics (12.4 gms. total) in the dyebath for 20 seconds. Dry the fabrics at 20° C. to remove excess solvent before final drying at 125° C. for 2 minutes. Rinse and wash with detergent as before. Iron dry.

Anhydrous ammonia application.—Prepare the dyebath with 3.9 gms. of dye in 260 ml. anhydrous ammonia. Dye is not entirely soluble. Saturate the fabrics (13.0 gms. total) in the dyebath for 20 seconds, drain, and air dry at 20° C. to remove excess ammonia. Dry at 125° C. for 2 minutes before rinsing, washing, and ironing dry as before.

Results of Examples II–IV inclusive.—By conventional aqueous dyeing technique, Disperse Blue 27 only stained cottons and rayons. Acetate, triacetate, nylon, Verel, and silk were dyed in deep shades. Some color was removed in dry cleaning. Disperse Blue 62 again only stained cottons and rayons. Acetate, triacetate, nylon, Verel were dyed in deep shades. Color was removed in dry cleaning. With both Disperse Blue 27 and Disperse Blue 62, lighter shades were obtained on Creslons and Dacrons. The lighter colors remained more permanent to dry cleaning. Disperse Violet 1 only stained cottons and rayons but produced deep shades on acetate, triacetate, Creslan, nylon, and Verel. Acrilan, Dacrons, Orlon, silk, and wool were also colored by Disperse Violet 1 applied conventionally.

The colors from Disperse Violet 1 were practically resistant to dry cleaning.

Application of the disperse dyes from organic solvent dyebath did not produce significant results. Disperse Blue 27, Disperse Blue 62, and Disperse Violet 1 did produce some coloration of acetate and triacetate, best coloration being obtained with the violet. Dry cleaning removed coloration in the blues while the violet coloration was resistant to dry cleaning.

From an anhydrous ammonia dyebath, Disperse Blue 27 dyed acetate, triacetate, and silk in dark shades. Lighter shades were obtained for nylon; Dacrons, cottons, and rayons were not highly colored. Dry cleaning removed some color in all cases. Similar results were observed for Disperse Blue 62. In both cases, triacetate dyed from anhydrous ammonia dyebath showed deeper shades than that dyed conventionally. Disperse Violet 1 applied from anhydrous ammonia dyed acetate, triacetate, nylon, and silk. Except in the case of silk, depth of color seemed only slightly deeper than colors obtained from organic solvent dyeing. Silk was much deeper. The colors were resistant to dry cleaning. However, coloration of the triacetate was less than that obtained by conventional dyeing.

In the case of the disperse dyes applied from anhydrous ammonia, although dry cleaning fastness is improved in going from the blues to the violet dye, depth of shade is also lost.

EXAMPLE V

Dye: Naphthol AS Supra (C.I. Azoic Coupling Component 2) (General Aniline and Film Corp.) Fast Blue Salt BBN (C.I. Azoic Diazo Component 20) (General Aniline and Film Corp.)

Naphthol dyeing requires two components, the naphthol dye and the developer, to obtain coloring. The naphthol dyestuffs are recommended for dyeing of cotton.

The Color Index describes the Azoic Coupling Component 2 (C.I. No. 27505) as 3-hydroxy-2-naphthanilide. It is sparingly soluble in alcohol and insoluble in water. The Azoic Diazo Component 20 (C.I. No. 37175) is described as 4'-amino-2',5'-diethoxy-benzanilide.

Normal application.—The naphthol bath is prepared with 4.7 gms. Naphthol AS Supra, 2.0 gms. total of sodium hydroxide, and 315 ml. total of distilled water. The naphthol is pasted in a small amount of methanol. Sodium hydroxide (1.0 gm.) in added, and water at 41° C. is poured over paste. The mixture is stirred until clear. Sodium hydroxide (1.0 gm.) dissolves and the remaining water is added.

The fabrics (15.7 gms. total) are saturated in the naphthol bath at 75–80° C. for 5 minutes. The fabrics are then air dried at 20° C. before introduction into the developer bath.

The developer bath is prepared from 10 gms. Fast Blue Salt BBN and 315 ml. of distilled water. The pH is adjusted with acetic acid to about 5.

The dry fabrics are now saturated in the developer solution at room temperature for 2–3 minutes. The fabrics are then promptly rinsed in cold water, finally washed in hot water with Alconox detergent, and ironed dry.

Organic solvent application.—The Naphthol AS was insoluble in methanol, dioxane, and trichloroethylene. Dyeing from organic solvent was not done.

Anhydrous ammonia application.—Dyeing from a completely anhydrous ammonia system could not be done because the developer was insoluble in the ammonia. However, dyeing was achieved in a two step process in which the naphthol is dissolved in anhydrous ammonia and the developer in an aqueous solution.

Naphthol AS (4.2 gms.) was dissolved in anhydrous ammonia (280 ml.). The fabrics (14.0 gms. total) were saturated in solution and then allowed to dry at room temperature. Then the fabrics were treated in the developer solution and finished as described under Normal Application.

Results.—Conventional two step dyeing produced deep colors on cottons, rayons, and even triacetate. Some staining of other fibers were noted. Because of the high alkalinity of the dyebath, wool fiber was destroyed. Dry cleaning removed color. Using anhydrous ammonia as a solvent for one dye component and water for the other, intense dyeings of cotton and rayons and silk were obtained. Coloration may be a deeper shade than a conventional dyeing. Some coloration is removed in dry cleaning. Triacetate was not dyed by this technique.

EXAMPLE VI

Dye: Levafix Brilliant Blue E-R (Verona Dyestuffs)
(C.I. Reactive Blue 44)

The Color Index does not describe this dye. The manufacturers describes the dye as a water-soluble reactive dye suitable for dyeing and printing of cotton and regenerated fibers. As reactive dyes, the Levafix E dyestuffs are capable of forming a chemical bond with cellulosic fibers. Best fixation is reported at approximately 40° C. in a long liquor ratio.

Normal application.—The dyebath is prepared with 3.6 gms. of dye in 240 ml. of distilled water. Fabric (12.0 gms. total) is entered into the bath at 40° C. Sodium chloride (12.0 gms.) is added and the dyebath run for 30 minutes. Sodium carbonate (3.6 gms.) is added and the bath run 60 minutes. Then the fabrics are removed, rinsed in hot water, washed in hot water containing Alconox detergent, and ironed dry.

Organic solvent application.—The dye was not soluble in acetone or dioxane. It was partially soluble in methanol. Prepare dyebath with 3.7 gms. dye in 244 ml methanol. Introduce fabrics (12.2 gms. total) into dyebath and saturate for 20 seconds. Remove fabrics, drain, and air dry at 20° C. Dry the fabrics at 120° C. before rinsing and washing and ironing dry as before.

Anhydrous ammonia application.—Prepare dyebath with 3.6 gms. of dye in 240 ml. of anhydrous ammonia. The dye does not appear completely soluble. Saturate the fabrics (12.1 gms. total) in the dyebath for 20 seconds. Dry off the excess ammonia at 20° C. before final drying at 120° C. for about 1 minute. Rinse, wash, and iron as before.

Results.—By conventional methods, dyeing of cottons, rayons, silk and nylon were obtained. Triacetate did not dye. Dry cleaning did not remove color.

Application of dyestuff from organic solvent did not produce color.

With anhydrous ammonia, deep dyeing of acetate, triacetate, and silk were obtained. Cottons and rayons were lightly dyed. Dry cleaning did not remove color.

EXAMPLE VII

Dye: Dykolite Peacock Blue 4GLF (Southern
Dyestuff Company) (Sulfur Dye)

No Color Index information is available for this dyestuff. The manufacturer describes it as a thiocondensate dye for cellulosic fibers. It is prereduced and is supplied as a powder soluble in water.

Normal application.—The dyebath is prepared by dissolving 4.4 gms. of dye and 28.4 gms. of urea in 290 ml. of distilled water to make a 1.5% solution of dye. The chemical bath is prepared by dissolving 4.0 gms. of sodium chloride and 1.1 gms. of Dykoset F-40 (the insolubilizing agent for the dye) in 290 ml. distilled water at about 40° C.

The dyebath is brought to 70° C. All fabrics (14.5 gms. total) are saturated for 3-5 seconds in the bath, are drained and dried at 20° C. The dry fabrics are saturated in the chemical bath at 40° C. The fabrics are drained and set for 2-5 minutes at 20° C. Fabrics are then rinsed in warm water, washed in a hot solution containing Alconox detergent, rinsed, and ironed dry.

Organic solvent application.—The Dykolite dye was found to be insoluble in acetone, 1,2-dichloroethane, and dioxane. It was only very slightly soluble in methanol. Insolubility of the dyestuff in common organic solvents precludes its application from this method.

Anhydrous ammonia application.—One step: To simplify the dyeing process, the dyestuff and fixative were placed in the same bath.

The dyebath is prepared by dissolving 4.7 gms. of dye and 1.2 gms. of Dykoset F-40 in about 315 ml. of anhydrous ammonia to make a 1.5% solution of dye. All fabrics (15.6 gms. total) are saturated for about 20 seconds in the dyebath. Air dry the ammonia from the fabrics at 20° C. Rinse the fabrics in warm water, wash in a hot solution containing Alconox detergent, and iron dry.

Anhydrous ammonia application.—Two step: In order to see if better coloring of fabric could be obtained from two step processing, dye was placed in one bath of anhydrous ammonia, and insolubilizer in another, and the fabrics were treated sequentially in each. The dyebath is prepared by dissolving 3.8 gms. of the dye in 248 ml. of anhydrous ammonia (1.5% solution of dye), and the insolubilizing bath by dissolving 1.0 gm. of Dykoset F-40 in 248 ml. of anhydrous ammonia. A total of 12.4 gms. of fabric is first saturated in the dyebath for 20 seconds. The excess ammonia is allowed to evaporate in air and then the fabrics are saturated for a few seconds in the insolubilizing bath. Excess ammonia is evaporated in air at about 20° C., followed by a quick oven dry at 135–140° C. The fabrics are rinsed and washed as before and then ironed dry.

Results.—Conventional two step dyeing produced light shades on cottons and rayons. Most other fibers seemed to be colored slightly. Dry cleaning did not remove color.

Because the sulfur dye and developer are not soluble in organic solvent, this technique could not be used for dyeing.

Application of dyestuff from anhydrous ammonia, either as a one step or two step process, produced similar results whereby intense color was imparted to acetate, triacetate, and silk. Cottons and rayons were lightly colored. Color was not removed in dry cleaning.

EXAMPLE VIII

The purpose of this example is to show how depth of shade varies with concentration of dye in anhydrous ammonia. Direct Blue 67 (Pyrazol Fast Brilliant Blue A) was selected as the dye for this study. The following dyebaths were prepared.

1 gm. dye in 300 ml. anhydrous ammonia
2 gms. dye in 300 ml. anhydrous ammonia
4 gms. dye in 300 ml. anhydrous ammonia Each fabric to be dyed was saturated for 20 seconds in the dyebath. The fabrics were dried in air at 20° C. to remove excess $NH_3$ and finally dried at 120° C. for 2 minutes. They were then washed in hot water containing Alconox detergent, rinsed, and ironed dry.

Results.—Increasing the amount of dyestuff does increase the depth of shade. Although mercerized cotton is reported to dye with a more intense shade by conventional techniques, little difference was seen between colors on mercerized and unmercerized cotton when dyestuff was applied from anhydrous ammonia.

EXAMPLE IX

The purpose of this example is to show how depth of shade varies with length of time in the dyebath. Direct Blue 67 (Pyrazol Fast Brilliant Blue A) was selected as the dye for this study. For each time interval, a dyebath was prepared with 1 gram of dye in 300 ml. of anhydrous ammonia. Fabric was saturated in the dyebaths for the following times:

2 seconds
20 seconds
1 minute
5 minutes

Excess ammonia was evaporated from fabrics at 20° C. before oven drying for 2 minutes at 120° C. The fabrics were then washed in hot water containing Alconox detergent, were rinsed, and finally ironed dry.

Results.—After 20 seconds, depth of shade does not appear to increase with increased time in the dyebath. Fabric treated for only 1 second appears lighter in shade than fabric treated 20 seconds. Therefore, dye pickup on the fiber seems to occur between 1 and 20 seconds. A 20 second time limit in anhydrous ammonia dyebath has been used in the experiments described in this work.

Depth of color appears to depend primarily on concentration of dyebath.

EXAMPLE X

The purpose of this example is to see if dyeing could be achieved by replacing anhydrous ammonia with an aqueous concentrated solution of ammonia. Analytical grade ammonium hydroxide 58% (28.0–30.0% $NH_3$) was used with Direct Blue 67 (Pyrazol Fast Brilliant Blue A). The dyebath was prepared with 2 gms. of dye in 300 ml. of the ammonium hydroxide. The fabric was saturated in the dyebath for 20 seconds, air dried at 20° C. to remove excess ammonia, and finally dried at 120° C. for two minutes. The fabrics were then washed in hot water containing Alconox detergent, rinsed, and ironed dry.

Results.—By comparing swatches, one sees that only anhydrous ammonia produces unique results. Triacetate is dyed intensely from anhydrous ammonia; it is not dyed at all from the ammonium hydroxide. Cotton and rayon are dyed less intensely from ammonium hydroxide. Acetate and silk are not dyed in ammonium hydroxide. They were dyed in anhydrous ammonia.

EXAMPLE XI

A number of other reactive dyes were used in the process of the present invention, including Procion Brilliant Blue MRS and Reactone Red 2B.

Procion Brilliant Blue MRS (ICI) (C.I. named Reactive Blue 4) is identified in the Reactive Dye Chart in Textile World, August 1964 as having the following structure:

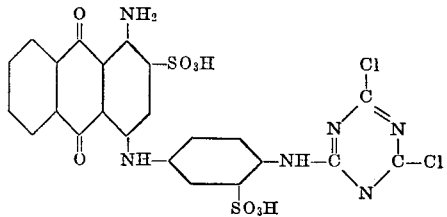

Reactone Red 2B, (Geigy) (C.I. named Reactive Red 17) has a structure according to Textile World, ibid, as follows:

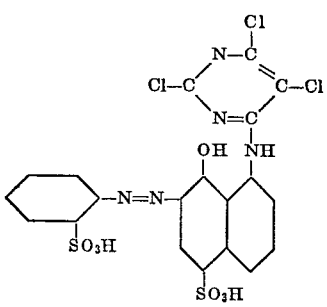

Dyeing was done on swatches of fabric (5) representing a number of different fibers. Swatches weighed between 2.5 to 3.0 grams approximately.

Dyebaths were prepared by dissolving 1.5 grams of dyestuff in 100 ml. of anhydrous liquid ammonia. The fabric was saturated in the dyebath for about twenty seconds, then removed and the excess ammonia allowed to evaporate at about 20° C. The fabric was then dried in an oven at about 120° C. to 130° C. for several minutes, washed in a hot aqueous solution containing Alconox detergent, rinsed in warm water and ironed dry.

Dyeing of fibers resulted as follows:

| Fiber | Reactive Blue 4 | Reactive Red 17 |
|---|---|---|
| Acetate (dull) | Deep color | Deep color. |
| Triacetate (dull) | do | Do. |
| Cotton (raw) | Light color | Medium color. |
| Silk | Deep color | Deep color. |
| Viscose | Medium color | Medium color. |

EXAMPLE XII

A number of other sulfur dyes were used in the process of the present invention including Dykolite Brilliant Orange 3G (Southern); Katigen Red Brown 9 RN High Concentration (GAF) identified as Sulfur Red 1, C.I. No. 53721; Katigen Yellow BG Extra (GF) identified as Sulfur Yellow 4, C.I. No. 53160; and Katigen Blue BCR Extra High Conc. (GAF) identified as Sulfur Blue 7, C.I. No. 53440.

Dykolite Brilliant Orange 3G has the following structure according to the article "Dykolite Dyestuffs for Cellulosie Fibers," Weston and Griffith, Textile Chemist and Colorist, 1, No. 22, pp. 67–82, in one isomeric form:

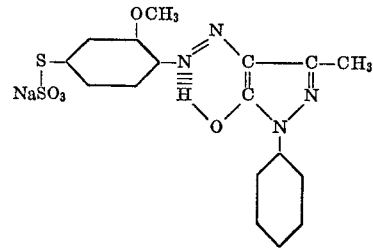

The dyebaths were prepared and dyeing achieved as in Example XI. Dyeing of several fibers resulted as follows:

| Fiber | Brilliant Orange 3G | Sulfur Red 1 | Sulfur Yellow 4 | Sulfur Blue 7 |
|---|---|---|---|---|
| Acetate (dull) | D | D | M | D |
| Acrilan 1656 | L | M | L | M |
| Triacetate (dull) | D | D | M | D |
| Cotton (raw) | L | D | L | M |
| Creslan 61 | L | D | L | M |
| Dacron 55 | L | L | L | M |
| Dacron 64 | L | L | L | M |
| Nylon 66 | L | L | L | M |
| Orlon 75 | L | M | L | M |
| Silk | D | D | D | D |
| Verel A | L | M | L | M |
| Viscose | D | D | D | D |
| Wool | L | L | L | M |

NOTE: L represents light coloration; M represents medium coloration; and D represents deep coloration.

As appears clearly from the foregoing, dyeing from a liquid ammonia dyebath offers a novel rapid method of dyeing at low temperatures, permits some unique combinations of dyestuff and fabric to be achieved, and allows, inexpensive direct dyes to be used to dye triacetate.

Since certain changes may be made in the above processes and products without departing from the scope of the invention herein involved, it is intended that all matter contained in the above description shall be interpreted in an illustrative and not in a limiting sense.

What is claimed is:

1. Method of dyeing shaped, organic materials by applying a dyebath of liquid ammonia having a dyestuff dissolved therein, to said materials.

2. Method as defined in claim 1 including the step of dissolving said dyestuff in a solvent of substantially anhydrous liquid ammonia to form said dyebath.

3. Method as defined in claim 1 wherein said dyestuff is selected from the group consisting of direct, disperse, naphthol, reactive and sulfur dyes.

4. Method as defined in claim 1 wherein said dyestuff is selected from the group consisting of direct and reactive dyes and said material is triacetate.

5. Method as defined in claim 1 wherein said dyebath is applied to said material for less than about twenty seconds.

6. Method as defined in claim 1 wherein said dyestuff is direct dye.

7. Method as defined in claim 1 wherein said dyestuff is a disperse dye.

8. Method as defined in claim 1 wherein said dyestuff is a naphthol dye.

9. Method as defined in claim 1 wherein said dyestuff is a reactive dye.

10. Method as defined in claim 1 wherein said dyestuff is a sulfur dye.

References Cited

UNITED STATES PATENTS

| | | | |
|---|---|---|---|
| 1,998,551 | 4/1935 | Mahn | 8—125 |
| 2,268,160 | 12/1941 | Miles | 8—DIG 15 |
| 3,102,323 | 9/1963 | Adams | 8—DIG 4 |
| 3,020,166 | 2/1962 | Wegmann et al. | 106—167 |

OTHER REFERENCES

Chem. Abstracts, vol. 33, 1939, col. 7664; vol. 34, 1940, col. 5753.

Chem. Abstracts, col. 740 (Yamaguchi).

R. Taft, J. Phys. Chem., 1930; pp. 2792–2800.

A. J. Hall, Textile World, August 1964, pp. 82, 90 and 92.

GEORGE F. LESMES, Primary Examiner

T. J. HERBERT, Jr, Assistant Examiner

U.S. Cl. X.R.

8—82